United States Patent [19]

Koch et al.

[11] Patent Number: 4,917,150

[45] Date of Patent: Apr. 17, 1990

[54] SOLENOID OPERATED PRESSURE CONTROL VALVE

[75] Inventors: Robert O. Koch, Warren; Warren H. Cowles, Farmington Hills; Keith D. Marsh, St. Clair Shores, all of Mich.

[73] Assignee: Colt Industries Inc., New York, N.Y.

[21] Appl. No.: 225,925

[22] Filed: Jul. 29, 1988

[51] Int. Cl.⁴ .......................................... F15B 13/044
[52] U.S. Cl. ........................... 137/625.65; 137/625.68; 251/129.21
[58] Field of Search ...................... 137/625.65, 625.68; 251/129.21

[56] References Cited

U.S. PATENT DOCUMENTS

| | | | |
|---|---|---|---|
| 3,285,285 | 11/1966 | Bielefeld | 137/625.65 |
| 4,513,780 | 4/1985 | Evans | 137/625.65 |
| 4,579,145 | 4/1986 | Leiber et al. | 137/625.65 |
| 4,655,249 | 4/1987 | Livet | 137/625.65 X |

Primary Examiner—Gerald A. Michalsky
Attorney, Agent, or Firm—Howard S. Reiter

[57] ABSTRACT

A solenoid actuated valve for regulating the fluid pressure at a control port by cyclically connecting the control port alternately to a fluid pressure supply source and to a sump includes a sleeve-like valve member slidably mounted on a fixed valve member for movement between two positions in response to energization or deenergization of the solenoid coil. The valve sleeve is the armature of the solenoid and operates within an internal chamber in the valve housing with pressure within the chamber balanced against its opposite ends. Energization and deenergization of the solenoid coil may be controlled by a processor which supplies a pulse width modulated electric control signal variable in response to processor inputs to establish a control port pressure which is accurately linearly related to the time duration of the pulse width modulated signal.

4 Claims, 2 Drawing Sheets

SOLENOID OPERATED PRESSURE CONTROL VALVE

BACKGROUND OF THE INVENTION

I. Field of the Invention

The present invention relates to solenoid operated pressure control valves employed in applications where the valve will accurately vary the pressure at a control port in accordance with variations in an electrical control signal, which may be derived from a computer, which varies the on-off time of energization of the solenoid.

II. Description of the Related Art

While there are many applications for such a valve, one application which has been of interest in recent years is that of the control of an automatic transmission for a motor vehicle by independently regulating the engagement pressure applied to each of the various clutches in the transmission. The torque transmitted by a given clutch may be varied by varying the pressure of engagement between the opposed clutch plates. Presently available electronic control units can rapidly and precisely generate the desired electrical output signals in response to sensed vehicle operating conditions. However, converting these electrical control signals into a precisely proportional fluid pressure which will accurately track variations in the electrical control signal has posed problems.

In such a system, a solenoid actuated valve is a logical choice as the interface between the electrical and hydraulic portions of the system. See, for example, U.S. Pat. No. 4,579,145 which describes a solenoid actuated valve for such an application. A system employing a valve of the type shown in that patent is described in some detail in SAE Technical Paper 840448.

As in U.S. Pat. No. 4,579,145 the solenoid actuated valve may be designed to regulate the pressure at a control port by cyclically connecting the control port alternately to a source of fluid under pressure and to a fluid sump, these alternate connections being made in accordance with the energization or deenergization of the solenoid coil. An electronic processor may be employed to regulate the time during each cycle the coil is energized ("on time"), the coil being deenergized for the remainder of the cycle ("off time"), this type of regulation being commonly referred to as pulse width modulation. A typical operating frequency might be 60 Hz. In steady state operation the pressure at the control port will be that percentage of the fluid source pressure which is equal to that percentage of time which the control port is connected to the fluid source, sump pressure being assumed to be zero.

In order to enable the control port pressure to be varied in a true linear relationship to variations in "on time" of the solenoid coil, the valve member which controls the fluid connection of the control port to pressure supply or sump must be capable of rapid shifting movement in close synchronism with the energization and deenergization of the coil. Further, the valve member should also be movable in response to a relatively small magnetic force in order to minimize the size and power requirements of the solenoid.

The present invention is especially directed to a solenoid valve having these last characteristics.

SUMMARY OF THE INVENTION

In accordance with the present invention, an elongate valve sleeve is slidably and sealingly mounted upon the exterior of an elongate fixed valve member. The opposite ends of the fixed valve member project beyond the opposite ends of the sleeve and are sealingly received within a housing at opposed ends of an internal chamber within the housing. The sleeve is slidable within the chamber within end limits of movement established by the engagement of one or the other end of the sleeve with the housing at opposite ends of the chamber. A solenoid coil is mounted in the housing in surrounding relationship with one end of the sleeve and a pole piece within the coil defines one end of the chamber. An axial air gap between the pole piece and the adjacent end of the sleeve, which is the armature of the solenoid, exists when the solenoid coil is not energized, and a relatively light coil spring within the chamber biases the sleeve or armature away from the pole piece. The opposite ends of the sleeve are both within the internal chamber of the housing so that the sleeve is pressure balanced at all times.

The fixed valve member is formed with blind bores extending inwardly from its opposite ends to terminate short of each other within the member. Radial ports from the inner ends of the respective blind bores open into the interior of the valve sleeve. The open ends of the blind bores respectively communicate with external ports at opposite ends of the housing and a third port in the exterior of the housing communicates with the internal chamber.

Two exemplary valving arrangements are disclosed. In a first arrangement, the valve is a normally opened valve; and when the solenoid is deenergized, the valve spring biases the valve sleeve to a position in which a port extending radially through the valve sleeve partially overlies the radial port from one blind bore while the valve sleeve blocks the radial port from the other blind bore. In this arrangement, the first blind bore is connected to a supply pressure source while the port from the chamber is a control port which, in the normal open position of the valve described above, is connected to the pressure port via the radial port in the valve sleeve. The other blind bore is connected to a sump which, in the normally open position of the valve, is isolated from the control port and supply pressure port.

Upon energization of the solenoid, the valve is shifted so that the radial port in the valve sleeve now partially overlies that radial port which communicates with the sump port while the sleeve blocks communication between the supply port and the control port.

In another valving arrangement, the internal chamber of the housing is connected to the supply port; one blind bore is connected to the control port and the other blind bore is connected to sump. At the inner end of the blind bore connected to the control port, radial ports open at the exterior of the fixed valve member in an enlarged diameter annular section which slidably engages the interior surface of the valve sleeve. An axially extending groove in the interior of the valve sleeve will, when the solenoid is deenergized, connect these latter radial ports to the supply port while blocking the radial ports from the other blind bore, and will block the supply port and connect those radial ports to the other blind bore when the solenoid is energized.

Other objects and features of the invention will become apparent by reference to the following specification and to the drawings.

DESCRIPTION OF THE PREFERRED EMBODIMENTS

Figure 1:
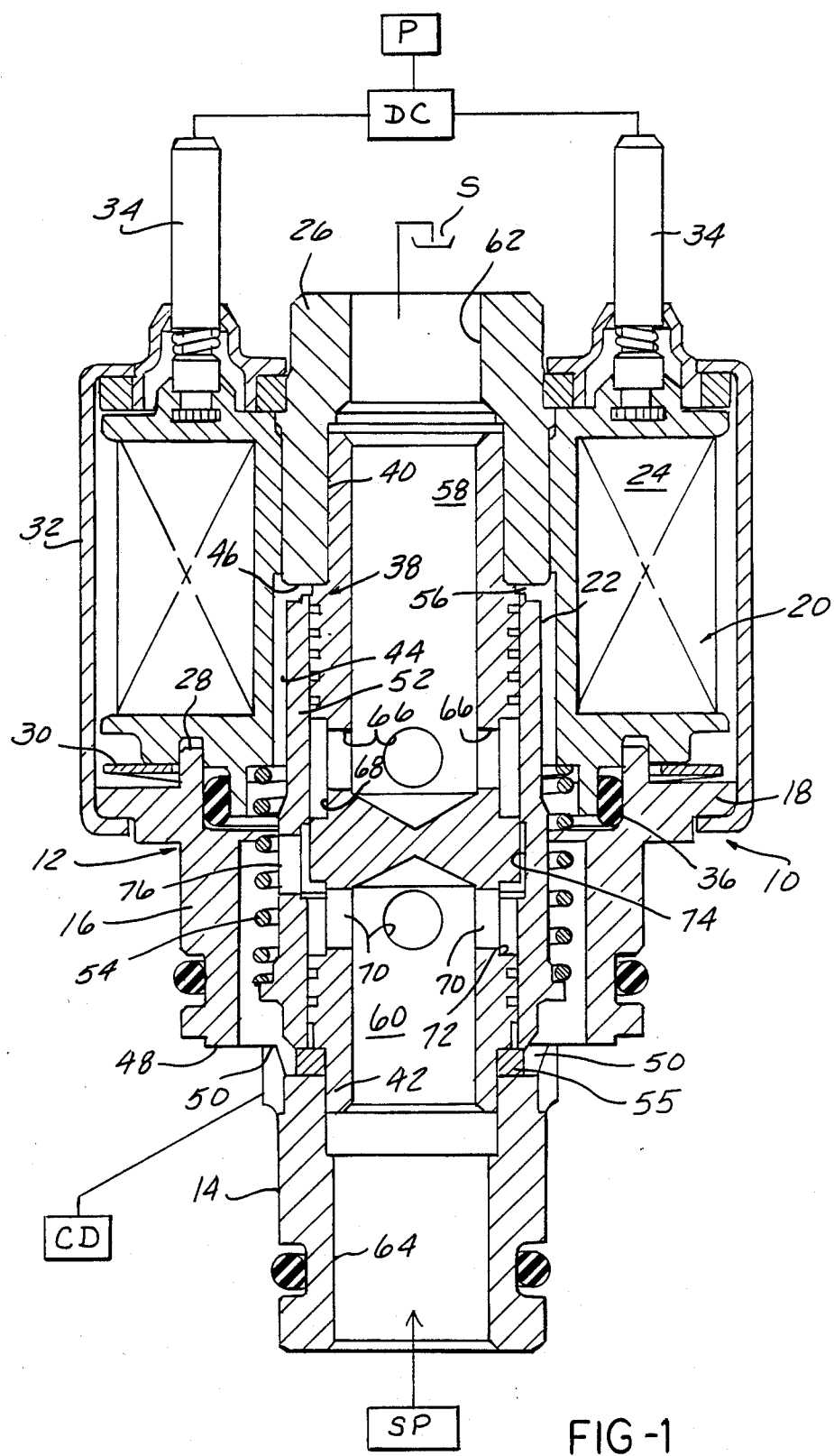
FIG. 1 is a cross-sectional view taken on an axial plane through a valve embodying the present invention.

Referring first to FIG. 1, one form of solenoid operated valve embodying the present invention includes a multi-part housing designated generally 10. Housing 10 is made up of a lower housing member 12 having a reduced diameter lower end section 14, a somewhat larger diameter intermediate section 16 and a radially outwardly projecting upper end section 18. A solenoid coil assembly designated generally 20 including an annular frame or bobbin 22, an annular solenoid coil 24 and a pole piece 26 is mounted upon the upper section 18 of the lower housing member and located in coaxial relationship with the lower housing member 12 as by a tongue-and-groove arrangement indicated at 28. A sinuous annular spring 30 engaged between solenoid frame 22 and upper section 18 of lower housing 12 biases solenoid assembly 20 upwardly into engagement with an annular case 32. A pair of prongs 34 project upwardly through the top of the case to provide electrical connections to the windings of solenoid coil 24. An O-ring 36 provides a fluid seal between lower housing 12 and solenoid assembly 20.

Within housing 10, an elongate fixed valve member 38 has its upper end tightly fitted within a bore 40 in pole piece 26, the fit between valve member 38 and bore 40 being tight enough to constitute a fluid-tight seal. The lower end of fixed valve member 38 is received within a bore 42 in lower section 14 of lower housing 12, again in sealed relationship with the wall of bore 42.

When the valve is fully assembled, all of the parts described thus far are fixedly and sealingly secured to each other. An elongate, annular internal chamber 44 is formed within these assembled parts to extend downwardly through housing 10 from the lower end 46 of pole piece 26 to the shoulder 48 at the lower end of intermediate section 16 of lower housing 12, the chamber 44 opening at the exterior of housing 10 through control ports 50 at the juncture of lower and intermediate sections 14 and 16 of the lower housing.

Within chamber 44, an elongate valve sleeve 52 is slidably and sealingly mounted on the exterior of fixed valve member 38. Valve sleeve 52 is constructed of a ferromagnetic material, and functions not only as a valve member, but also constitutes the armature of solenoid coil 24. A coil spring 54 resiliently biases sleeve 52 downwardly against a spacer 55 located within housing 10 at the lower end of chamber 44. When valve sleeve 52 is engaged with spacer 55, a relatively small air gap 56 exists between pole piece 26 of the solenoid and the upper end of valve sleeve 52 which, as noted above, is the armature of the solenoid.

Fixed valve member 38 is formed with two blind bores 58, 60 which extend longitudinally inwardly respectively from the upper and lower ends of member 38. The upper end of upper blind bore 58 opens into a port 62 in pole piece 26 which in turn opens at the exterior of housing 10. The lower end of lower blind bore 60 similarly opens into a port 64 in the lower section 14 of lower housing 12, port 64 likewise opening to the exterior of housing 10. Radial bores 66 extend outwardly from the lower end of upper blind bore 58 to open into an annular groove 68 in the outer surface of fixed member 38, while similar radial bores 70 extend outwardly from the upper end of lower blind bore 60 to open into an annular groove 72 in the outer side of member 38. Both annular grooves 72 and 68 are axially overlapped by sleeve 52.

The inner wall of sleeve 52 is formed with an annular groove 74 whose axial length is somewhat greater than the axial distance between the adjacent ends of the annular grooves 68, 72 in fixed valve member 38. One or more radial ports 76 in the wall of sleeve 52 place annular groove 74 of the sleeve in direct communication with chamber 44, and hence control port 50.

When the valve of FIG. 1 is in its normal open position, the lower end of annular groove 74 in valve sleeve 52 axially overlaps the annular groove 72 in fixed valve member 38, thus placing control port 50 of the valve in communication with port 64 at the lower end of the valve housing, this communication being from control port 50 via port 76 in valve sleeve 52, annular groove 74 of the valve sleeve, annular groove 72 of the fixed valve member and thence via ports 70 to blind bore 60 which opens into port 64. This fluid communication will exist at all times when solenoid coil 24 is not energized.

Upon energization of solenoid coil 24, the magnetic flux across air gap 56 between pole piece 26 and valve sleeve 52 will cause valve sleeve 52 to move upwardly against the biasing action of spring 54 until the upper end of valve sleeve 52 engages the lower end of pole piece 26. When sleeve 52 has moved upwardly into engagement with pole piece 26, annular groove 74 of the valve sleeve has moved upwardly a sufficient distance so that the upper end of groove 74 in the sleeve now overlaps the annular groove 68 in fixed valve member 38 and the lower end of groove 74 in the valve sleeve has moved upwardly beyond the upper end of annular groove 72. This movement of valve sleeve 52 seals the annular groove 72 and blocks fluid communication between groove 72 and port 76 of the sleeve, while at the same time placing port 76 in communication with the upper annular groove 68 in the fixed valve member. Fluid communication is thus established between control port 50 and the port 62 at the upper end of housing 10. This communication is from port 50 via chamber 44 to port 76, and thence via the overlapping grooves 74 and 68 and the ports 66 to upper blind bore 58 and thence to port 62.

External devices connected to the valve described above are indicated schematically in FIG. 1. The electric terminals 34 of solenoid coil 24 are electrically connected to a direct current power source indicated at DC which energizes coil 24 in cyclic pulses under the control of an electronic processor P. Processor P will be supplied with appropriate inputs, depending upon the particular application, to vary the "on" time of the solenoid during each cycle. In an automatic transmission control application, for example, inputs to the processor might include engine speed, vehicle speed, throttle position, etc. The pulsation frequency is a fixed frequency, typically 60 Hz and the processor will control the length or percentage of time during each cycle during which the solenoid coil is energized.

Control port 50 of the valve is hydraulically connected to a controlled device, such as a pressure actuated clutch in the automatic transmission application. Port 64 of the valve is connected to a supply of fluid under pressure SP and port 62 is connected to a fluid sump S.

As described above, when solenoid coil 24 is deenergized, valve sleeve 52 is in the position shown in FIG. 1 which establishes fluid communication between the control device CD and the fluid pressure supply source SP. At this time, the sump S is hydraulically isolated by valve sleeve 52 from both the control device CD and the pressure source SP.

When solenoid coil 24 is energized, valve sleeve 52 is shifted, as described above, to establish fluid communication between the control device CD and sump S, while at the same time valve sleeve 52 isolates supply source SP from the control device CD.

With the solenoid 24 being energized in cyclic pulses of a time duration determined by the processor P and deenergized between successive pulses, the pressure supplied to the control device CD will be a percentage of the pressure differential between the supply source SP and sump S which is equal to the percentage of time solenoid coil 24 is deenergized. For example, if it is assumed that source SP supplies fluid at 100 psi and the pressure existing at sump S is zero psi, if solenoid coil 24 is deenergized 50% of the time, the pressure supplied to the control device CD will be 50 psi. If solenoid coil 24 is deenergized 70% of the time, the pressure supplied to control device CD will be 70 psi.

Effectively, valve sleeve 52 is cyclically reciprocated between its two positions in accordance with the cyclic energization and deenergization of coil 24. When the coil is deenergized, the control device CD is connected to a fluid pressure source; and when the solenoid coil is energized, the control device CD is connected to a fluid sump or exhaust.

The arrangement shown in FIG. 1 is well adapted to facilitate the required rapid shifting of the valve sleeve 52 between its two positions. With the exception of its biasing spring 54, valve sleeve 52 is the only moving part of the structure and its hollow, tubular configuration provides a relatively lightweight part. Sleeve 52 is constructed of steel or some other appropriate ferromagnetic material and functions as the armature of the solenoid without requiring additional moving parts. Only a relatively short stroke of sleeve 52 is required to shift the valve connections which enables the magnetic circuit to operate with a relatively small air gap. The sleeve is pressure balanced since both of its opposite ends are exposed within chamber 42, and the pressure within chamber 42 thus has no influence on movement of sleeve 52 between its operating positions. The forces exerted by spring 54 and solenoid coil 24 may thus be relatively small forces while achieving the desired rapidity of movement of sleeve 52.

In the configuration shown in FIG. 1, lower portion 14 and intermediate portion 16 are of cylindrical configuration and conform to be mounted, in a plug-in fashion, into a manifold housing having internal passages appropriately located to match up with ports 50 and 64 of the valve.

Figure 2:
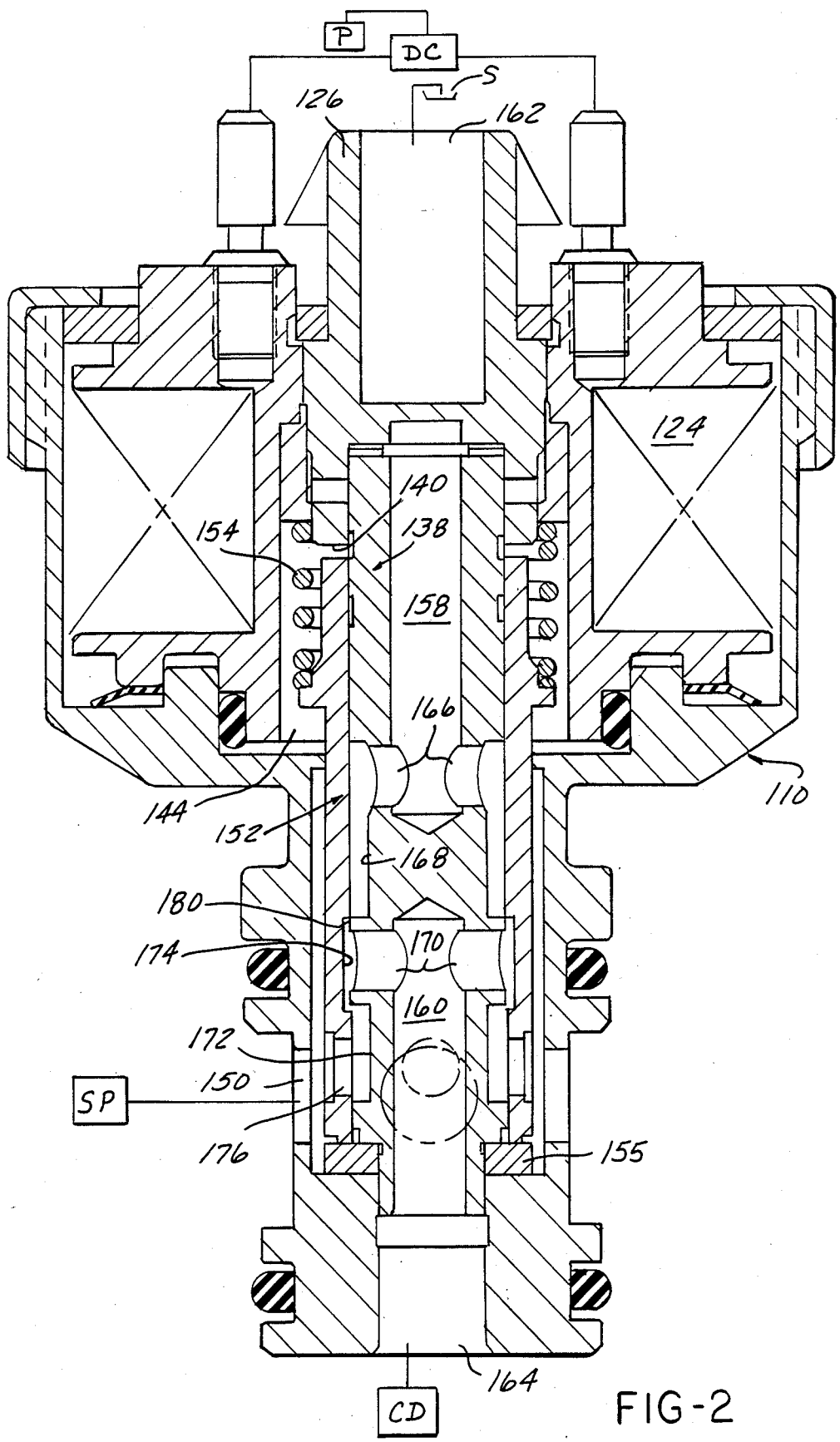
FIG. 2 is a cross-sectional view taken on an axial plane through a modified form of valve embodying the present invention.

In FIG. 2, a modified form of valve incorporating many of the features of the valve of FIG. 1 is disclosed. The valve of FIG. 2 includes a housing designated generally 110 of a construction somewhat modified from that of housing 10 of FIG. 1 but, like the housing of FIG. 1, containing a solenoid coil 124, and elongate fixed valve member 138 which extends longitudinally through an internal chamber 144 within housing 110 and has an elongate valve sleeve 152 slidably received on its outer surface for movement upon member 138 limited by the engagement of the opposite ends of sleeve 152 with the lower end of a pole piece 140 at the upper end of housing 110 and a spacer 155 at the lower end of housing 110. As in the previous case, a spring 154 is engaged between the housing and valve sleeve 152 to resiliently bias sleeve 152 downwardly to its lower end limit of movement as shown in FIG. 2. While the external porting arrangement of the valve of FIG. 2 is generally similar to that of FIG. 1, including a first port 150 opening into chamber 144 from the exterior of the housing and valve ports 162 and 164 at the opposite ends of the housing opening into blind bores 158 and 160 in fixed valve member 138, the porting arrangement of fixed valve member 138 and valve sleeve 132 differs in certain respects from that of the valve of FIG. 1.

Fixed valve member 138 of the FIG. 2 valve is formed with a relatively long, annular recess 168 which communicates with blind bore 158 via radial ports 166.

Blind bore 160, however, communicates with the exterior of fixed valve member 138 via radial ports 170 which open at the outer surface of valve member 138 as opposed to opening into an annular recess as do the corresponding ports 70 of the valve of FIG. 1. A second annular recess in the outer periphery of fixed valve member 138 is identified by reference numeral 172 and is offset downwardly from ports 170.

An annular recess 174 in the interior wall of valve sleeve 152 has an axial length slightly greater than the axial distance between the annular recesses 168 and 172 in fixed valve member 138. As shown in FIG. 1, when valve sleeve 152 is at its lower end limit of movement relative to the fixed valve member, port 150 communicates with port 164 via a radial port 176 through the wall of valve sleeve 152, the overlapping recesses 172 in member 138 and 174 in sleeve 152 and thence through ports 170 and blind bore 160 to port 164. At this time, the valve sleeve slightly overlaps the exterior of fixed valve member 138 at 180 so that recess 164 is hydraulically isolated from both ports 150 and 164.

When the solenoid coil 124 of the FIG. 2 valve is energized, valve sleeve 152 is magnetically urged upwardly until its upper end contacts the lower end 140 of pole piece 126. At this time, the lower end of recess 174 in valve sleeve 152 is moved upwardly above the upper end of recess 172 in fixed valve member 138 to block fluid communication between port 150 and recess 174. However, the upper end of recess 174 has moved upwardly a distance sufficient to place recess 174 in communication with recess 168 in the fixed valve member 138, thus placing port 164 in communication with port 162 via the overlapping recesses, ports 166 and blind bore 158.

As in the previous case, communication between one port of the valve is alternately established with one or the other of the other two ports of the valve, dependent upon whether the solenoid coil is energized or deenergized. As in the previous case, the valve sleeve 152 is of a ferromagnetic material and functions as the movable armature of the solenoid.

The valve of FIG. 2 is provided with electrical connections similar to that of the valve of FIG. 1, namely a DC power source is connected to the windings of solenoid coil 124 and controlled by processor P to supply pulsed energization to coil 144 as described above.

The hydraulic connections to the valve of FIG. 2 differ somewhat from those shown and described in FIG. 1 in that port 164 of the FIG. 2 valve is connected to the control device, while the pressure source SP is connected to port 150. Port 162 is connected to sump, as in the previous case.

Operation of the FIG. 2 embodiment is essentially the same as that described above in connection with the valve of FIG. 1, with the exception that in FIG. 2 it is the port 164 which is alternatively connected either to port 150 or port 162, depending upon whether the solenoid is deenergized or energized. As was the case with the valve of FIG. 1, the valve of FIG. 2, with the exception of the valve biasing spring, has only a single movable part, namely, the valve sleeve 152, and this sleeve operates within a chamber in which pressure forces tending to move the valve are balanced. Thus, the valve requires only a very light biasing spring and a relatively small, and thus more compact, solenoid coil having a relatively low-power requirement. As in the previous case, valve sleeve 152 is positively located in either of its two positions simply by the engagement of one or the other end of the valve with a fixed portion of the valve housing.

While exemplary embodiments of the invention have been described in detail, it will be apparent to those skilled in the art the disclosed embodiments may be modified. Therefore, the foregoing description is to be considered exemplary rather than limiting, and the true scope of the invention is that defined in the following claims.

What is claimed is:

1. A pressure control valve comprising: an elongate fixed valve member having a first blind bore therein extending longitudinally from one end of said member to an inner end communicating with a first valve member port opening at the side of said member and a second blind bore extending longitudinally from the opposite end of said member to an inner end communicating with a second valve member port opening at the side of said member at a location longitudinally spaced from said first port, an elongate tubular valve sleeve of magnetic material slidably and sealingly mounted upon said member for longitudinally sliding movement on said member in longitudinally overlapping relationship with both of said first and second valve member ports, a housing fixedly and sealingly secured to the opposite ends of said fixed valve member and having an elongate internal chamber surrounding the exterior said sleeve and said member, said chamber having a length accommodating sliding movement of said sleeve longitudinally of said member between a first and a second position relative to said member, means in said housing defining an externally accessible supply port, an externally accessible control port and an externally accessible exhaust port, one of said externally accessible ports communicating with said first blind bore, a second of said externally accessible ports communicating with said second blind bore and a third of said externally accessible ports communicating with said chamber, means defining a first annular recess in the outer side of said valve member longitudinally overlapping said first valve member port, means defining a second annular recess in the outer side of said valve member longitudinally spaced from said first annular recess, means defining a third annular recess in the inner side of said sleeve extending longitudinally of said valve member between said first and second recesses to longitudinally overlap said first recess when said sleeve is in said first position and to longitudinally overlap said second recess and said second valve member port when said sleeve is in said second position, means defining a valve port through the wall of said sleeve placing said chamber in constant fluid communication with one of said second and third recesses, spring means biasing said sleeve to one of said first and second positions, and a solenoid coil in said housing operable when energized to establish a magnetic field magnetically biassing said sleeve to the other of said first and second positions against the action of said spring means.

2. The invention defined in claim 1 wherein said housing includes an annular pole piece projecting axially into one axial end of said solenoid coil and coaxially fixedly and sealing receiving one end of said fixed valve member in that end of said pole piece projecting into said coil, the last-mentioned end of said pole piece projecting radially outwardly from said fixed valve member to define a fixed stop engageable with one end of said sleeve to establish said other of said first and second positions of said valve sleeve relative to said fixed valve member.

3. The invention defined in claim 1 wherein said valve port opens into said third recess and said second port opens into said second recess.

4. The invention defined in claim 1 wherein said valve port opens into said second recess and said second port is located longitudinally of said valve member between said first and second recess and said second port is in constant fluid communication with said third recess.

* * * * *